May 27, 1947.　　　D. S. BINNINGTON　　　2,421,311
STEAM GENERATOR
Filed Jan. 1, 1944
FIG. 1
FIG. 3
FIG. 2
FIG. 4
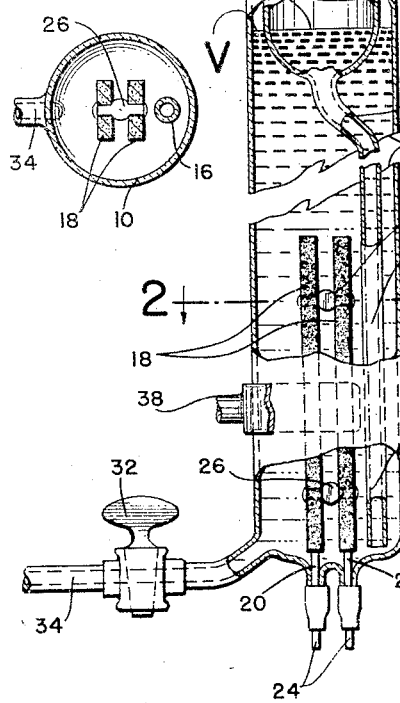
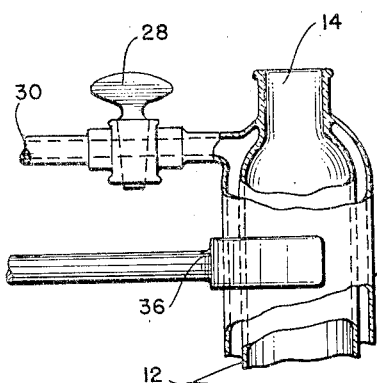
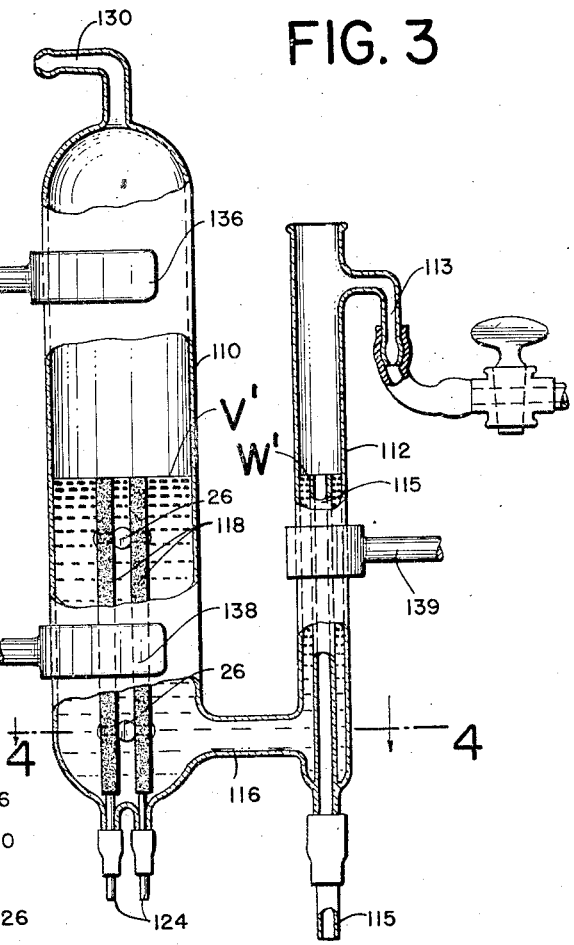
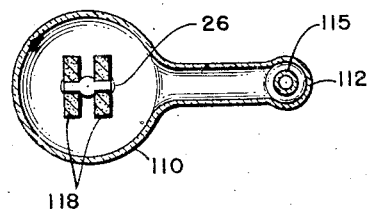
INVENTOR.-
DONALD S. BINNINGTON
BY Arthur R. Lbrylie
ATTY.

Patented May 27, 1947

2,421,311

UNITED STATES PATENT OFFICE 2,421,311

STEAM GENERATOR

Donald S. Binnington, Minneapolis, Minn., assignor to General Mills, Inc., a corporation of Delaware Application January 1, 1944, Serial No. 516,719

3 Claims. (Cl. 219—40)

This invention relates to steam generators, particularly small ones, for use in chemical laboratories and the like.

An object of this invention is the provision of a simple, inexpensive steam generator which will supply pure steam as needed.

Another object is to provide such a steam generator which will operate with a minimum of attention and with a maximum of safety.

These and other objects, as will hereinafter appear, are accomplished by this invention which is fully described in the following specification and shown in the accompanying drawings in which Figure 1 is a side elevation of one embodiment of the invention showing portions broken away;

Fig. 2 is a transverse horizontal section on the line 2—2 of Fig. 1;

Fig. 3 is a view similar to Fig. 1 showing a modified form of the device; and

Fig. 4 is a transverse horizontal section on the line 4—4 of Fig. 3.

The embodiment shown in Figs. 1 and 2 comprises a closed vertical chamber 10, preferably made from a large glass tube, in the upper portion of which is sealed a smaller glass reservoir 12 having a mouth 14 extending through the chamber. The bottom of the reservoir terminates in a glass tube 16 which extends to a point near the bottom of the chamber 10.

Spaced electrodes 18 are mounted on suitable metal leads 20, 22 which pass through the bottom of the chamber and are hermetically sealed therein. These are connected to terminals 24 which in turn are adapted to be connected to a suitable source of alternating current electricity. The electrodes 18, which are preferably made of carbon, are held spaced apart by suitable insulators 26, 26 which may be made of glass or other suitable plastic.

A valve 28 may be placed on the outlet pipe 30 to control the flow of steam as it is generated and a similar valve 32 serves to close the drain pipe 34. Suitable clamps 36, 38 carried by a stand, not shown serve to support the generator. The operation of the device is as follows.

With the valve 32 closed, water is poured in through the opening 14 until it assumes a level V, W. A suitable alternating current voltage is then applied to the terminals 24 and current will flow through the water, which is preferably distilled water, with a small amount of some chemical added to make it electrically conductive. Electric current thus passing through the water between the electrodes will cause the water to be heated and steam to be generated. This steam will pass up and out through a pipe 30 to any point where it is desired that the steam shall be utilized. If the valve 28 is partially closed or if back pressure generates anywhere in the pipe 30, this back pressure will cause the level of the water V in the chamber to fall as this back pressure forces this water up through the tube 16 into the reservoir 12, thereby raising the level of the water W. This may continue until substantially all the water in the chamber 10 passes up into the reservoir 12, thereby uncovering the electrodes 18 and stopping the generation of steam. Radiation of heat from the apparatus will rapidly bring about a lowering of the steam pressure thereby permitting some of the water in the reservoir 12 to pass down to the tube 16 into the bottom portion of the chamber 10, again covering all or a portion of the electrodes and again rapidly bringing about the generation of steam since this water is still very close to the boiling point. This regurgitation of the water back and forth through the tube 16 may continue indefinitely so long as this back pressure is maintained. From time to time, it will be necessary to add more water to the system as steam is utilized.

In Figs. 3 and 4 is shown a modified form of the apparatus in which a chamber 110 is provided near its top with a steam outlet tube 130 while spaced electrodes 118 are supported from the bottom of the chamber as before.

A water reservoir 112 is situated alongside the steam generating chamber and is connected thereto by means of a tube 116. Water is fed to the reservoir 112 through a tube 113 and the reservoir is provided with an overflow pipe 115 which passes to a drain. Electric terminals 124 connect the electrodes to a suitable source of electric current and clamps 136, 138, 139 carried on suitable stands, not shown, serve to support the apparatus.

The operation of this apparatus is as follows. Water flows in preferably continuously through the tube 113 so as to maintain water at the level V' in the chamber at the level W' in the reservoir. Normally these two are at the same level where there is no back pressure in the tube 130. When back pressure develops, however, the water level V' is lowered, the water passing over into the reservoir 112 and going out through the overflow. If this pressure is sufficiently great substantially all the water surrounding the electrodes will be forced out of the chamber 110, leaving these electrodes bare and stopping generation of steam. As soon, however, as this pressure is relieved, either by steam flowing through the tube 130 or through cooling of the apparatus due to radiation, water in the reservoir 112 will tend to return in the chamber 110 to the point V', again partially or wholly covering the electrodes and resuming the generation of steam.

In the form shown in Figs. 3 and 4 water is forced at intervals out of the generating chamber thereby purging it of dissolved salts which otherwise might accumulate causing changes in the conductivity of the liquid between the electrodes.

By passing the first steam generated to atmosphere, the air in the generator is expelled, after which the apparatus is kept closed and is rendered air-free.

Thus it will be seen that I have provided a very simple and efficient generator for steam and one which provides purer steam for use in a laboratory and one which requires a minimum of attention.

While I have shown and described but a few embodiments of my invention, it is to be understood that it is capable of many modifications. Changes, therefore, may be made which do not depart from the spirit and scope of my invention as disclosed in the appended claims.

I claim as my invention:

1. A steam generator comprising a closed vertical chamber having a tube leading from the top for carrying off steam as generated, spaced electrodes enclosed in the bottom adapted to be connected to a source of alternating current, a reservoir for water in the upper part of the chamber and having a tube extending to the lower part of the chamber near the lower ends of the electrodes so that back pressure of steam will force water in the lower portion of the chamber up into the reservoir reducing the area of the electrodes in contact with water thereby decreasing in the rate of generation of steam.

2. A steam generator comprising a closed vertical chamber of glass having a tube leading from the top for carrying off steam as generated, spaced electrodes enclosed in the bottom adapted to be connected to a source of alternating current, a reservoir for water alongside the chamber and connected thereto near the lower ends of the electrodes, means for maintaining a predetermined level of water in the reservoir, whereby back pressure of steam will force water in the lower portion of the chamber back into the reservoir reducing the area of the electrodes in contact with water, thereby decreasing the rate of generation of steam.

3. A steam generator comprising a closed vertical chamber having a tube leading from the top for carrying off steam as generated, spaced electrodes enclosed in the bottom adapted to be connected to a source of alternating current, a reservoir open to the atmosphere and located in the upper portion of said chamber, and a tube leading from lower portion of said reservoir to the lower portion of said chamber, whereby steam pressure in said chamber will cause water in the bottom thereof to pass into the reservoir thereby causing the electrodes to be uncovered with a corresponding decrease in the rate of generation of steam.

DONALD S. BINNINGTON.

REFERENCES CITED

The following references are of record in the file of this patent:

UNITED STATES PATENTS

| Number | Name | Date |
| --- | --- | --- |
| 2,180,445 | Vickery | Nov. 21, 1939 |
| 1,987,381 | Twombly | Jan. 8, 1935 |
| 1,944,348 | Kelley | Jan. 23, 1934 |
| 1,723,738 | Lang | Aug. 6, 1929 |
| 1,502,295 | DeKermor | July 22, 1924 |